US 8,985,110 B2

(12) United States Patent
Townsend

(10) Patent No.: US 8,985,110 B2
(45) Date of Patent: Mar. 24, 2015

(54) DIAPHRAGM

(75) Inventor: Paul Townsend, Northumberland (GB)

(73) Assignee: Draeger Safety UK Limited, Northumberland (GB)

( * ) Notice: Subject to any disclaimer, the term of this patent is extended or adjusted under 35 U.S.C. 154(b) by 468 days.

(21) Appl. No.: 13/420,064

(22) Filed: Mar. 14, 2012

(65) Prior Publication Data

US 2012/0260919 A1  Oct. 18, 2012

(30) Foreign Application Priority Data

Apr. 18, 2011 (GB) .................................. 1106479.7
Mar. 7, 2012 (GB) .................................. 1204044.0

(51) Int. Cl.
*A61M 11/00* (2006.01)
*A62B 9/02* (2006.01)
*F16K 7/12* (2006.01)

(52) U.S. Cl.
CPC .. *A62B 9/027* (2013.01); *F16K 7/12* (2013.01)
USPC ............. 128/204.26; 128/205.24; 128/205.25

(58) Field of Classification Search
CPC ................. A61M 16/0683; A61M 2210/0618; A61M 16/0666; A61M 16/06; A61M 16/0057
USPC ............ 128/204.26, 205.12, 205.24, 205.25, 128/205.27, 206.12, 206.17, 206.21, 128/206.28, 202.29, 230.11, 201.25
See application file for complete search history.

(56) References Cited

U.S. PATENT DOCUMENTS

| 3,276,462 | A | * | 10/1966 | Matchett .................. 137/505.12 |
| 3,795,257 | A | * | 3/1974 | Fabish et al. .................. 137/491 |
| 3,995,625 | A | * | 12/1976 | Needham .................. 128/204.26 |
| 5,016,627 | A | * | 5/1991 | Dahrendorf et al. ..... 128/205.24 |
| 8,025,053 | B1 | * | 9/2011 | Prete et al. ............... 128/204.26 |
| 2004/0261794 | A1 | | 12/2004 | Patterson et al. |

FOREIGN PATENT DOCUMENTS

| GB | 2 394 432 A | 4/2004 |
| WO | 2004/052464 | 6/2004 |
| WO | 2005/000409 | 1/2005 |

OTHER PUBLICATIONS

UK Search Report dated Aug. 18, 2011.

* cited by examiner

Primary Examiner — Steven Douglas
(74) Attorney, Agent, or Firm — DLA Piper LLP (US)

(57) ABSTRACT

A diaphragm for a lung demand valve, including a chemical, biological, radiological and/or nuclear (CBRN) layer which is sufficiently resistant to the permeation of at least some CBRN agents and a resilient layer which is resiliently deformable. The CRBN layer is arranged to restrict the permeation of at least some CBRN agents through the diaphragm, and the resilient layer is arranged to allow the diaphragm to be resiliently deformed.

24 Claims, 3 Drawing Sheets

DIAPHRAGM

CROSS REFERENCE TO RELATED APPLICATIONS

This application claims the priority of UK Patent Application No. 1106479.7 filed on Apr. 18, 2011 and UK Patent Application No. 1204044.0 filed on Mar. 7, 2012, the entire contents of which are incorporated herein by reference.

BACKGROUND OF THE INVENTION

The invention relates to a diaphragm for a lung demand valve, in particular, although not exclusively, to a lung demand valve suitable for use in CBRN environments.

A lung demand valve (LDV) is typically used with breathing apparatus in order to control the supply of breathable gas to the user. An LDV usually comprises a flexible diaphragm that responds to pressure changes so as to control the flow of the breathable gas. A first side of the diaphragm is exposed to ambient pressure and the second side of the diaphragm is exposed to the pressure within the face-mask. The diaphragm is typically manufactured from an elastomer such as silicone.

If the LDV is to be used in chemical, biological, radiological and/or nuclear (CBRN) environments, it is necessary to prevent CBRN agents from being inhaled by the user. Since silicone is permeable, measures must be taken to ensure that CBRN agents cannot permeate through the diaphragm.

EP 1 575 675 A1 discloses a face-mask mechanically coupled to a LDV. The face-mask comprises a main mask and an inner mask which fits over the wearer's mouth and nose. The interior of the inner mask is in fluidic communication with the interior of the main mask by means of non-return valves. The interior of the main mask is in fluidic communication with an inlet port which is mechanically and fluidically coupled to a supply port of the LDV. The LDV includes a diaphragm and a cover which defines a passage through which exhaled air is used to flush the space around the diaphragm. Thus, any toxic or undesirable gas in the vicinity of the diaphragm is pushed out to the atmosphere by the exhaled air flowing past and around the diaphragm. This can prevent CBRN agents from accumulating on the outer surface of the diaphragm and permeating through the diaphragm.

EP 1 638 650 A1 discloses a LDV for use with breathing apparatus. The LDV has a valve assembly that includes an inlet for connection to a source of breathing gas, an outlet for connection to a face-mask to provide breathing gas to the user, and an actuator for controlling the flow of breathing gas between the inlet and the outlet in response to the user's respiration. The LDV further includes a flexible elastomeric diaphragm in operative connection with the actuator. The diaphragm is exposed to ambient pressure on a first side and exposed to a positive pressure within the face-mask on a second side. The regulator assembly also includes an impermeable and flexible shield that is spaced from the diaphragm and seals the first side of the diaphragm from certain toxic substances in the ambient atmosphere, while allowing the first side of the diaphragm to experience ambient pressure. The flexible shield moves along with the diaphragm during respiration without dampening the movement of the diaphragm during respiration of the user.

Whilst the above described arrangements may be appropriate in some circumstances, the complexity and therefore cost of the lung demand valve is increased when compared with a conventional lung demand valve.

It is therefore desirable to provide an improved arrangement.

SUMMARY OF THE INVENTION

I provide a diaphragm for a lung demand valve, including a CBRN layer which is sufficiently resistant to the permeation of at least some CBRN agents, and a resilient layer which is resiliently deformable, wherein the CRBN layer is arranged to restrict the permeation of at least some CBRN agents through the diaphragm, and wherein the resilient layer is arranged to allow the diaphragm to be resiliently deformed.

I also provide a method of upgrading a lung demand valve such that it is suitable for use in CBRN environments, including removing a conventional diaphragm from a lung demand valve, and subsequently fitting the lung demand valve with a diaphragm, including a CBRN layer which is sufficiently resistant to the permeation of at least some CBRN agents, and a resilient layer which is resiliently deformable, wherein the CRBN layer is arranged to restrict the permeation of at least some CBRN agents through the diaphragm, and wherein the resilient layer is arranged to allow the diaphragm to be resiliently deformed.

I also provide a lung demand valve, including a main housing defining an internal chamber, a breathing port which is in fluid communication with the internal chamber and through which in use a user inhales, a breathable gas inlet which in use is connected to a supply of breathable gas, a valve assembly for controlling the supply of breathable gas to the user through the internal chamber and breathing port, a diaphragm for controlling the valve assembly and which in use responds to the inhalation and exhalation of the user, wherein the diaphragm includes a laminate structure including a continuous CBRN layer which is sufficiently resistant to the permeation of at least some CBRN agents and a discontinuous resilient layer which is resiliently deformable, wherein the CRBN layer is arranged to restrict the permeation of at least some CBRN agents through the diaphragm, and wherein the resilient layer is arranged to allow the diaphragm to be resiliently deformed.

BRIEF DESCRIPTION OF THE DRAWINGS

Embodiments of the invention will now be described, by way of example only, with reference to the accompanying drawings.

DETAILED DESCRIPTION

Figure 1:
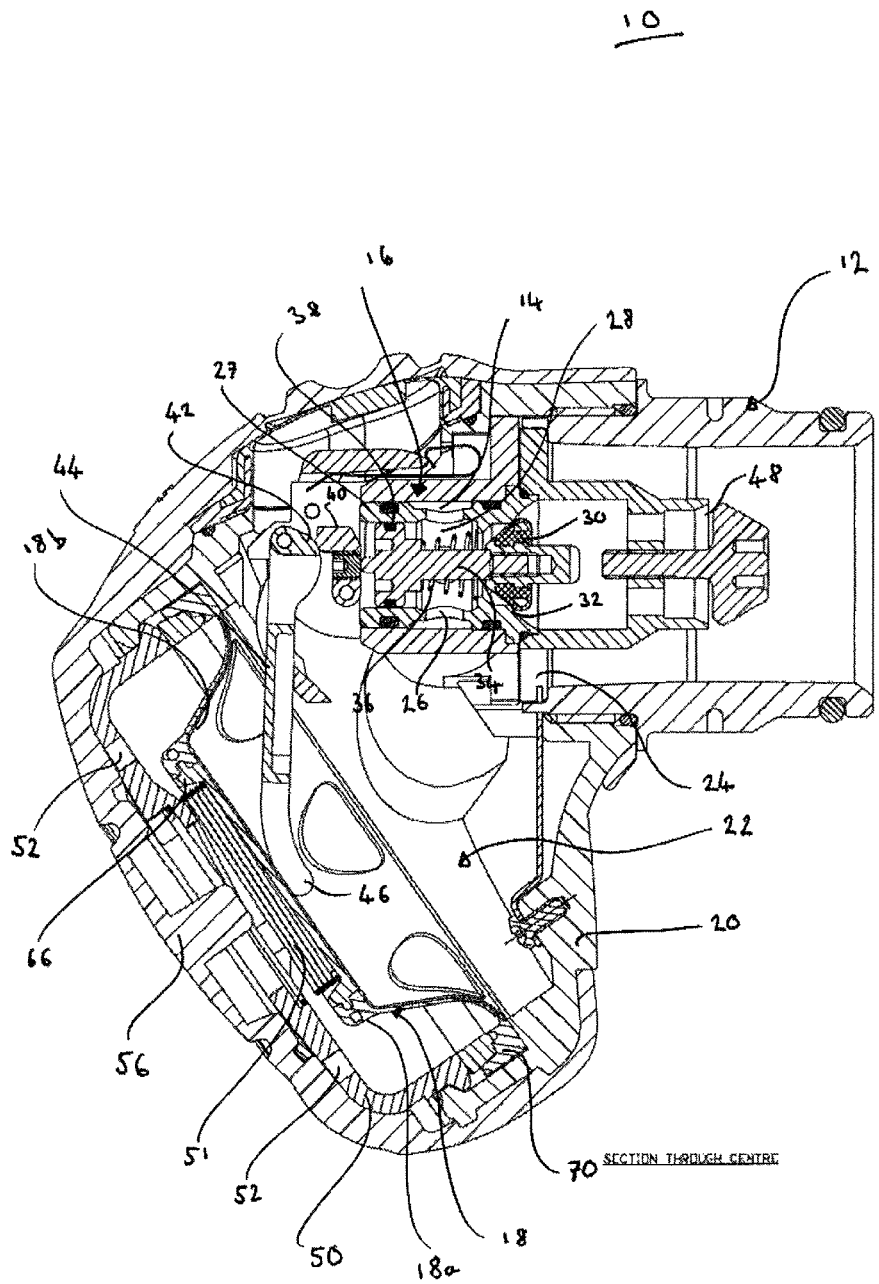
FIG. 1 schematically shows a cross-sectional view through a lung demand valve.

In a broad aspect the invention concerns a CBRN or barrier layer of a diaphragm for a lung demand valve that is arranged to restrict the permeation of at least some CBRN agents through the diaphragm.

The term "CBRN" will be used throughout the description and claims and is an acronym for "chemical, biological, radiological and/or nuclear."

According to an aspect of the invention there is provided a diaphragm for a lung demand valve, comprising: a CBRN (or barrier) layer which is sufficiently resistant to the permeation of at least some CBRN (or hazardous) agents; and a resilient layer which is resiliently deformable; wherein the CRBN (or barrier) layer is arranged to restrict the permeation of at least some CBRN (or hazardous) agents through the diaphragm, and wherein the resilient layer is arranged to allow the diaphragm to be resiliently deformed. The diaphragm may be suitable for use in at least some CBRN or hazardous environments. The CBRN layer may be referred to as a barrier layer. The resilient layer may ensure that the diaphragm responds appropriately to differential pressure changes across the diaphragm. The diaphragm may be referred to as a composite diaphragm.

The CBRN layer may prevent, restrict or inhibit certain types of CBRN agents, such as those which may typically be encountered by persons working in hazardous environments, from permeating through the diaphragm. This may ensure that a person using the lung demand valve does not inhale CBRN agents that may be present in the ambient atmosphere.

The resilient layer may ensure that the composite diaphragm is sufficiently resiliently deformable such that in use it can respond to the differential pressure changes and control the supply of breathable gas. The resilient layer may therefore act as the spring of the diaphragm. The resilient layer may be sufficiently resilient over a wide range of temperatures such that the diaphragm, and hence the lung demand valve, can operate over a wide temperature range.

The composite diaphragm may therefore have a first CBRN layer that prevents the user from inhaling hazardous CBRN agents, and a second resilient layer that ensures that the diaphragm responds appropriately to differential pressure changes over a wide temperature range.

The CBRN layer may be sufficiently resistant to the permeation of CBRN agents such that the diaphragm, and/or a lung demand valve which it is part of, complies with certain CBRN requirements. The CBRN requirements may be NIOSH 42 CFR 84.63, the entire and/or BS8468-1 2006, the entire contents of which are incorporated herein by reference.

The resilient layer may be sufficiently resiliently deformable such that the diaphragm, and/or a lung demand valve which it is part of, complies with certain requirements. The requirements may be NIOSH 42 CFR 84 and/or NFPA 1981 and/or EN137, the entire contents of each are incorporated herein by reference.

The CBRN layer may be deformable. The CBRN layer may be substantially continuous. In other words, the CBRN layer may not have any openings or holes that would allow CBRN agents to pass through the diaphragm.

The CBRN layer may comprise a plastics material. The plastics material may comprise polyvinylidene fluoride (PVDF), polyvinyl fluoride (PVF) or polyether ether ketone (PEEK).

The CBRN layer may have a thickness of between 0.001-0.05 mm, or 0.002-0.03 mm, or 0.003-0.02 mm. The thickness may be less than 0.05 mm, or less than 0.03 mm, or less than 0.02 mm.

The resilient layer may be discontinuous. This may mean that the resilient layer is provided with one or more slots or openings, for example. The resilient layer may comprise at least one opening. The resilient layer may comprise a plurality of openings. The openings may be circumferentially arranged around the diaphragm. The openings may be circular and the resilient layer may be symmetrical. The resilient layer may be in the form of a web. The slots or openings may be arranged uniformly. The resilient layer may be rotationally symmetric. Further, the diaphragm may be rotationally symmetric. The resilient layer and/or the diaphragm may have rotational symmetry of order at least three. Having a discontinuous resilient layer may allow the resilient properties of the complete diaphragm to be tailored to suit the particular requirements, for example, the breathing requirements of the lung demand valve. The resilient layer may form a support structure for the CBRN layer.

The resilient layer may comprise an elastomer. The resilient layer may comprise silicone.

The resilient layer may have a thickness of between 0.1-2 mm, or 0.2-1.5 mm, or 0.3-1 mm. The thickness may be less than 2 mm, or less than 1.5 mm, or less than 1 mm, or less than 0.8 mm.

The diaphragm may comprise a sealing edge or lip that is arranged to be retained by a part of the lung demand valve so as to provide a seal preventing fluid flow across the diaphragm. The resilient layer may comprise a sealing lip that is retained in a recess of the lung demand valve.

The CBRN layer and the resilient layer may be bonded together to form a laminate. The CBRN layer and the resilient layer may be heat bonded together or may be bonded together using an adhesive.

The resilient layer may be arranged such that in use it is on the ambient side. This would mean that the resilient layer is exposed the atmosphere. The CBRN layer may be arranged such that in use it is on the fresh breathable gas side. This would mean that the CBRN layer is exposed to the breathable gas within the lung demand valve. However, it should be appreciated that the layers could be the opposite way round.

The diaphragm may further comprise a substantially rigid plate against which in use a spring and/or valve lever acts. The rigid plate may be attached to the resilient layer or the CBRN layer. The rigid plate may be adhered to either layer. The resilient layer may comprise a plate opening within which the rigid plate is located. The CBRN layer may extend across the rigid plate and may be continuous. Alternatively, the CBRN layer could be bonded to the rigid plate.

The diaphragm, the resilient layer and/or the CBRN layer may be substantially circular. The diameter of the diaphragm may be between 30-90 mm, or 40-80 mm, or 50-70 mm.

The diaphragm may have a central portion and a winged side.

The invention also concerns a lung demand valve comprising a diaphragm in accordance with any statement herein.

The invention further concerns a breathing apparatus comprising a lung demand valve in accordance with any statement herein.

According to a second aspect of the invention there is provided a method of upgrading a lung demand valve such that it is suitable for use in CBRN environments, comprising removing a conventional diaphragm from a lung demand valve, and subsequently fitting the lung demand valve with a diaphragm in accordance with any statement herein. A "conventional" diaphragm may be a diaphragm that is not CBRN compliant.

According to a further aspect of the invention there is provided a diaphragm for a lung demand valve comprising a barrier layer which is resistant to the permeation of at least some hazardous agents and a support structure that is resiliently deformable. The barrier layer may ensure that that hazardous agents, such as CBRN agents, are restricted from permeating through the diaphragm, and the support structure may ensure that the diaphragm is resiliently deformable and responds to the appropriate pressure changes.

According to yet a further aspect of the invention there is provided a lung demand valve, comprising: a main housing defining an internal chamber; a breathing port which is in fluid communication with the internal chamber and through which in use a user inhales; a breathable gas inlet which in use is connected to a supply of breathable gas; a valve assembly for controlling the supply of breathable gas to the user through the internal chamber and breathing port; a diaphragm for controlling the valve assembly and which in use responds to the inhalation and exhalation of the user; wherein the diaphragm comprises: a laminate structure comprising a continuous CBRN layer which is sufficiently resistant to the permeation of at least some CBRN agents and a discontinuous resilient layer which is resiliently deformable; wherein the CRBN layer is arranged to restrict the permeation of at least some CBRN agents through the diaphragm, and wherein the resilient layer is arranged to allow the diaphragm to be resiliently deformed.

The invention may comprise any combination of the features and/or limitations referred to herein, except combinations of such features as are mutually exclusive.

FIG. 1 schematically shows a lung demand valve (LDV) 10 that is typically used in conjunction with self-contained breathing apparatus. The LDV 10 comprises a plug-in connector 12 for attaching the LDV 10 to a breathing apparatus face-mask (not shown), a breathable gas inlet 14 which is arranged to be connected to a supply of breathable gas such as a cylinder of compressed air (not shown), a valve assembly 16 for controlling the supply of breathable gas, and a diaphragm 18 for controlling the valve assembly 16. The LDV 10 is suitable for use in chemical, radiological, biological and nuclear (CBRN) environments and therefore complies with certain standards which will be described in detail below. In this particular embodiment the LDV 10 is conventional, except for the CBRN compliant diaphragm 18. In this arrangement the CBRN compliant diaphragm 18 is of a similar size to that of a conventional diaphragm and therefore a conventional LDV can be retrofitted and therefore upgraded for CBRN compliance. This can be done by simply replacing a conventional diaphragm with a CBRN compliant diaphragm 18.

The LDV 10 comprises a main housing 20 which defines an internal chamber 22. The plug-in connector 12 is attached to the housing and is in fluid communication with the internal chamber 22 through a fluid passageway 24.

The valve assembly 16 is disposed within the housing 20 and comprises a gas inlet 26 which opens into a valve chamber 28 defined by a valve housing 27. The valve assembly 16 also comprises a valve member 30 which cooperates with a valve seat 32 to open and close the valve. The valve member 30 is attached to an actuation shaft 34 and a spring 36 acts on the shaft 34 so as to bias the valve member 30 to a closed position. The shaft 34 is sealed within the valve housing with an O-ring 38. This allows the actuation shaft 34 to axially move within the valve housing to open and close the valve, whilst sealing the valve housing to prevent undesirable gas leakage. A cam follower 40 is attached to the end of the shaft 34 and cooperates with a cam 42 that is provided on the end of a pivotable lever arm 44. As will be described in detail below, the distal end 46 of the lever arm 44 cooperates with the diaphragm 18 to open and close the valve. The valve assembly 16 further comprises a breathable gas outlet 48 which is arranged to discharge breathable gas into the region of the plug-in connector 12 such that it can be breathed by a user.

The diaphragm 18 is a CBRN compliant diaphragm and is located within the housing 20. The diaphragm 18 is substantially circular and is retained within the housing by a cap 50 that is attached to the housing 20. A spring 51 is disposed between the cap 50 and the ambient side of the diaphragm 18 and therefore acts on the diaphragm 18. The diaphragm 18 is sealed within the housing such that there is no gas flow from the chamber 22 across the diaphragm 18. The cap 50 is provided with a number of openings 52 and is covered with a removable protective rubber cover 54 which is also provided with openings (not shown). This allows ambient atmosphere to both come into contact with, and act on, the diaphragm 18.

In use, the plug-in connector 12 of the LDV 10 is attached to a breathing apparatus face-mask (not shown) and the gas inlet 14 is attached to a cylinder of breathable gas (not shown). In the resting state, the diaphragm is in the position shown in FIG. 1 and the valve assembly 16 is closed such that breathable gas is not supplied to the user. As the user inhales, the pressure within the face-mask, and therefore within the chamber 22 is reduced so that it is below the ambient pressure. The pressure acting on the ambient side 18a of the diaphragm 18 is therefore greater than the pressure acting on the breathable gas side 18b of the diaphragm 18. This causes the diaphragm 18 to resiliently deform into the chamber 22. The movement of the diaphragm 18 causes the lever arm 44 to pivot in the anti-clockwise direction and the cam 42 acts on the follower 44 such that the shaft 34 axially moves to the right. The movement of the shaft 34 lifts the valve member 30 off the valve seat 32 and therefore allows breathable gas to flow from the valve chamber 28 out of the valve assembly 16 through the gas outlet 48. In this manner breathable gas is discharged into the region of the plug-in connector 12 where it flows to the face-mask such that it can be breathed by a user. As breathable gas is discharged by the valve assembly 16, the pressure within the face-mask and hence the chamber 22 increases. This causes the diaphragm 18 to return towards its original position. As the diaphragm 18 moves out from the chamber 22, the spring 36 of the valve assembly 16 acts to return the valve member 30 to a position in which it is in contact with the valve seat 32. This therefore closes the valve assembly 16 and stops the flow of breathable gas to the face-mask. When the user next inhales, the process is repeated.

There are a number of requirements that an LDV must comply with so that it can be deemed safe for use. The requirements may be any one or more of the following, the entire contents of which are incorporated herein by reference:
NIOSH 42 CFR 84
NFPA 1981
EN137

The diaphragm 18 of this embodiment has been designed such the LDV 10 complies with the above requirements. The detailed construction of the diaphragm 18 will be described below. In summary, the diaphragm 18 is suitably sensitive to differential pressure changes across the diaphragm 18 so that the LDV 10 operates correctly to supply the appropriate amount of breathable gas to the user as required. The diaphragm 18 also ensures that the LDV 10 functions correctly over the wide temperature range that may be experienced by potential users. Further, the diaphragm 18 ensures that the LDV 10 is capable of supplying breathable gas at the high breathing rates that may typically occur in use.

An LDV must also comply with various CBRN requirements, if it is to be suitable for use in CBRN environments. The requirements may be any one or more of the following, the entire contents of which are incorporated herein by reference:
NIOSH 42 CFR 84.63
BS8468-1 2006

These requirements centre around ensuring that certain CBRN agents do not permeate through the diaphragm 18 from the ambient side into the chamber 22 so as to prevent CBRN agents being inhaled by a user. NIOSH 42 CFR 84.63 is shown below.

Statement of Standard

The SCBAs must meet the following minimum requirements:
  Approval under NIOSH 42 CFR Part 84, Subpart H Compliance with National Fire Protection Association (NFPA) Standard 1981 for Open-Circuit Self-Contained Breathing Apparatus for Fire Fighters Special Tests under NIOSH 42 CFR 84.63(c)
(1) Chemical Agent Permeation and Penetration Resistance Against Distilled Sulfur Mustard (HD) and Sarin (GB)
(2) Laboratory Respirator Protection Level (LRPL)

(1). Chemical Agent Permeation and Penetration Resistance Against Distilled Mustard (HD) and Sarin (GB) Agent Test Requirement Open-circuit, positive-pressure SCBAs, including all components and accessories except the air cylinder (shell), shall resist the permeation and penetration of distilled sulfur mustard (HD) and sarin (GB) chemical agents when tested on an upper-torso manikin connected to a breathing machine operating at an air flow rate of 40 liters per minute (L/min), 36 respirations per minute, 1.1 liters tidal volume.

Test requirements for distilled sulfur mustard (HD) are shown in Table 1.

TABLE 1

Simultaneous Liquid and Vapor Challenge of SCBA with Distilled Sulfur Mustard (HD)

| Agent | Challenge Concentration | Duration of Challenge (min) | Breathing Machine Airflow Rate (L/min) | Maximum Peak Excursion (mg/m$^3$) | Maximum Breakthrough (concentration integrated over Minimum Service Life) (mg-min/m$^3$) | Number of Systems Tested | Minimum Service Life (hours) |
|---|---|---|---|---|---|---|---|
| HD-Vapor | 300 mg/m$^3$ | 30$^{(1)}$ | 40 | 0.60$^{(3)}$ | 6.0$^{(4)}$ | 3 | 6$^{(2)}$ |
| BD-Liquid | 0.86 ml | 360 | | | | | |

$^{(1)}$Vapor challenge concentration will start immediately after the liquid drops have been applied and the test chamber has been sealed.
$^{(2)}$The test period begins upon start of initial vapour generation
$^{(3)}$Three consecutive sequential test data points at or exceeding 0.6 mg/m$^3$ will collectively constitute a failure where each test value is based on a detector sample time of approximately 2 minutes.
$^{(4)}$The cumulative Ct including all peak data points must not be exceeded for the duration of the 6-hour test.

Test requirements for sarin (GB) agent are shown in Table 2.

TABLE 2

Vapor Challenge of SCBA with Sarin (GB)

| Challenge Agent | Vapor Concentration (mg/m$^3$) | Vapor Challenge Time (minutes) | Breathing Machine Airflow Rate (L/min) | Maximum Peak Excursion mg/m$^3$ | Maximum Breakthrough (concentration integrated over Minimum Service Life) (mg-min/m$^3$) | Number of Systems Tested | Minimum Service Life (hours) |
|---|---|---|---|---|---|---|---|
| GB | 2,000 mg/m$^3$ | 30$^{(1)}$ | 40 | 0.087$^{(3)}$ | 2.1$^{(4)}$ | 3 | 6$^{(2)}$ |

$^{(1)}$The vapor challenge concentration generation will be initiated immediately after test chamber has been sealed.
$^{(2)}$The test period begins upon initial generation of vapour concentration.
$^{(3)}$Three consecutive sequential test data points at or exceeding 0.087 mg/m$^3$ will collectively constitute a failure where each test value is based on a detector sample time of approximately 2 minutes.
$^{(4)}$The cumulative Ct including all peak data points must not be exceeded for the duration of the 6-hour test.

(2). Laboratory Respiratory Protection Level (LRPL) Test Requirement

The measured laboratory respiratory protection level (LRPL) for each open-circuit positive-pressure self-contained breathing apparatus shall be ≤500, when the SCBA facepiece is tested in a negative pressure mode in an atmosphere containing 20-40 mg/m$^3$ corn oil aerosol of a mass median aerodynamic diameter of 0.4 to 0.6 micrometers.

The diaphragm 18 of this embodiment has been designed such the LDV 10 complies with the above CBRN requirements. The detailed construction of the diaphragm 18 will be described below. In summary, the diaphragm 18 is sufficiently resistant to the permeation of at least some CBRN agents through the diaphragm 18. This ensures that in use a user does not inhale dangerous levels of hazardous CBRN agents.

It should be appreciated that the LDV 10 may also, or instead, comply with other similar requirements.

Figure 2:
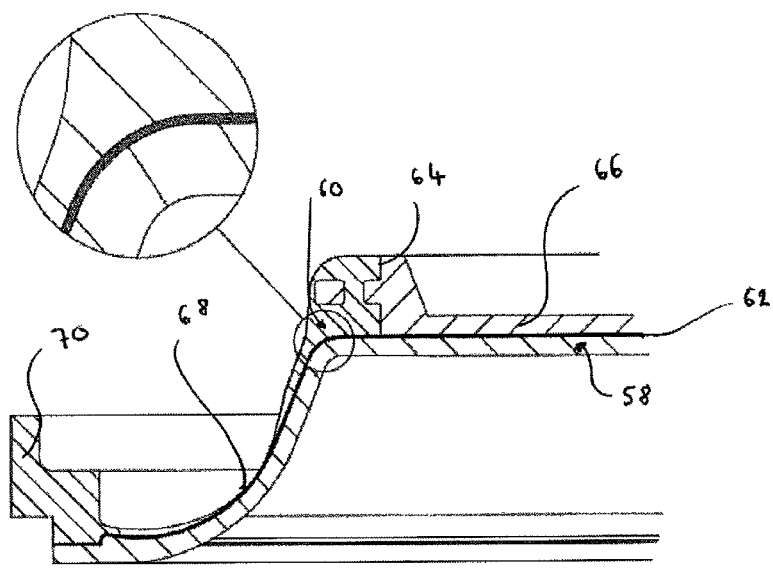
FIG. 2 schematically shows the diaphragm of the lung demand valve of FIG. 1.
Figure 3:
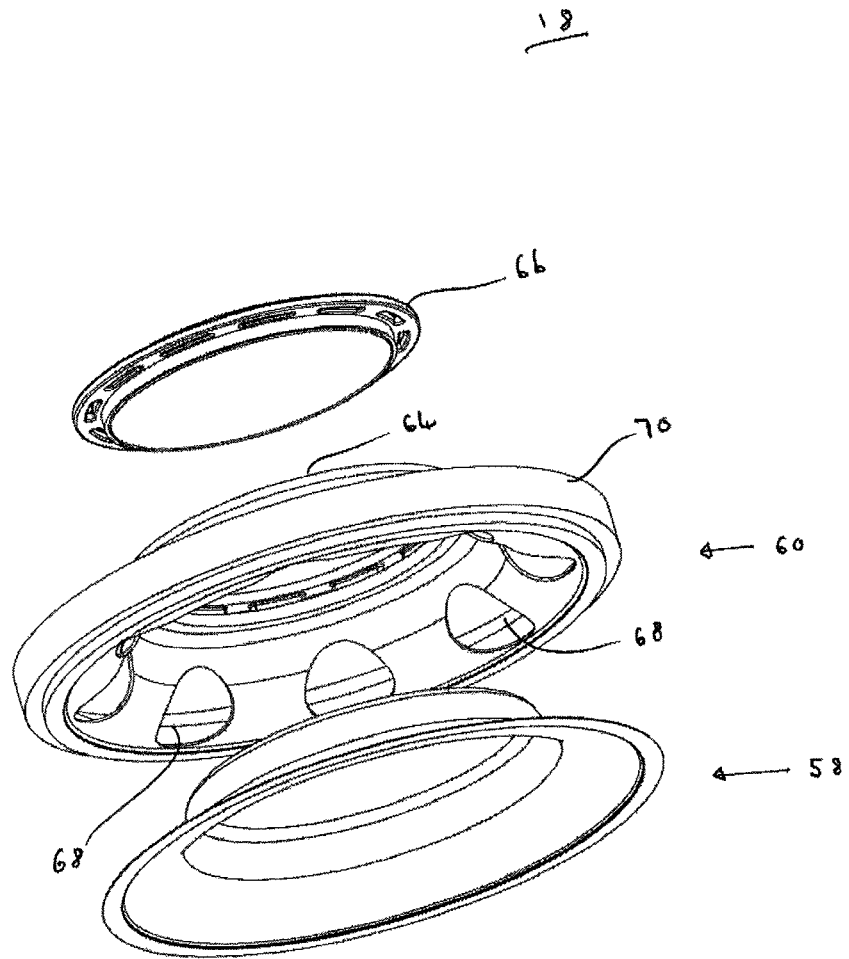
FIG. 3 schematically shows an exploded view of the lung demand valve of FIG. 1.

With reference to FIGS. 2 and 3, the diaphragm 18 comprises a first CBRN layer 58, which may be referred to as a barrier layer, and a second resilient layer 60, which may be referred to as a support structure. The CBRN layer 58 and the resilient layer 60 are bonded together with a layer of adhesive 62, thereby forming a laminate structure. The CBRN layer 58 and the resilient layer 60 are coextensive with one another and have a common periphery. The resilient layer 60 comprises a central opening 64 within which is disposed a rigid disc (or plate) 66. The disc 66 is fixedly attached to the resilient layer 60 and the CBRN layer 58 extends across and underneath the disc 66.

The CBRN layer 58 is a thin film of polyvinylidene fluoride (PVDF) having a thickness of approximately 0.013 mm. It should be appreciated that other suitable materials may be used for the CBRN layer 58. For example, the CBRN layer may be a polyvinyl fluoride (PVF) film, or a polyether ether ketone (PEEK) film. Further, the CBRN layer 58 may be of any suitable thickness.

The CBRN layer 58 is non-porous and impermeable and therefore acts as a barrier. In particular, the CBRN layer 58 is sufficiently resistant to the permeation of hazardous agents, such as the CBRN agents sarin and mustard gas. The CBRN layer 58 therefore acts to prevent the permeation of CBRN agents through the diaphragm. It should be noted that the CBRN layer 58 may not be completely impermeable to all CBRN agents. For example, it may be permissible that CBRN agents permeate the CBRN layer, and hence the diaphragm, in extremely small concentrations. The CBRN layer 58 may therefore only be sufficiently resistant to the permeation of at least some CBRN agents such that an LDV 10 comprising the diaphragm 18 passes appropriate CBRN tests. The appropriate test may be NIOSH 42 CFR 84.63 and/BS8468-1 2006 or similar.

The CBRN layer 58 is also flexible and is therefore capable of being deformed. In particular, the CBRN layer 58 maintains its flexibility over a wide range of operating temperatures. This is important as the LDV 10 comprising the diaphragm 18 is required to perform correctly over a wide temperature range at various breathing rates.

The resilient layer 60 is resiliently deformable and therefore allows the diaphragm 18 as a whole to be resiliently deformed. The resilient layer 60 is made from silicone and has a thickness that varies from between 0.3-0.8 mm. It should be appreciated that any suitable material may be used for the resilient layer 60, providing it has the appropriate resilient properties. Further, the thickness may be altered depending on the specific requirements. The periphery of the resilient layer 60 comprises a sealing lip 70. When the diaphragm 18 is located within the LDV housing 20, the sealing lip 70 provides a seal between the housing 20 and the diaphragm 18 and prevents gas flow across the diaphragm 18.

The resilient layer 60 is discontinuous and is provided with a number of circumferentially spaced openings 68 (in this case eight) that are distributed equally around a circumference of the diaphragm. The resilient layer 60, and therefore the diaphragm 18 as a whole, is therefore rotationally symmetric and has rotational symmetry of order eight. Since the resilient layer 60 is rotationally symmetric, the diaphragm 18 has substantially uniform resilient characteristics. These openings 68 reduce the stiffness of the diaphragm 18 such that it responds appropriately. The stiffness of the diaphragm 18 can be increased by increasing the overall area of the resilient material (i.e. by reducing the total area of the openings) and similarly the stiffness of the diaphragm 18 can be reduced by reducing the overall area of the resilient material (i.e. by increasing the total area of the openings). It may be possible to adjust the resilient characteristics of the diaphragm 18 by only adjusting the thickness of the resilient layer 60, but this may be limiting as there may be maximum and minimum thicknesses that must be complied with. Therefore, adjusting the ratio of openings to resilient material of the resilient layer 60 provides a convenient way of modifying the resilient properties of the resilient layer 60 and hence the diaphragm 18. In some cases, adjusting the openings/resilient material ratio of the resilient layer 60 may be the only feasible way of achieving the required resilient characteristics in order to meet specific operational requirements.

The non-porous CBRN layer 58 not only acts as a barrier to hazardous agents, but also transfers the pressure differential to the discontinuous resilient layer 60. Therefore, even though the resilient layer 60 is discontinuous, the diaphragm 18 as a whole operates correctly and responds to pressure changes.

The resilient layer 60 ensures that the diaphragm 18 as a whole is sufficiently sensitive, and responds appropriately, to pressure changes across the diaphragm. This means that in use the LDV 10 performs in the desired manner and complies with the performance requirements set out in EN137, NIOSH 42 CFR 84 and NFPA 1981. It may be necessary to alter the ratio of openings to resilient material of the resilient layer 60 to meet the requirements so that the LDV 10 operates correctly and meets the performance requirements.

In summary, the combination of a CBRN barrier layer 58 which is resistant to the permeation of hazardous agents and a resilient layer 60 which is resiliently deformable, provides a diaphragm 18 which is resistant to the permeation of hazardous agents and is suitably sensitive to differential pressure changes.

The diaphragm 18 described above is of a similar size and shape to that of certain conventional diaphragms, i.e. those that are not CBRN compliant. This allows a standard LDV to be upgraded and retrofitted with a CBRN compliant diaphragm 18, such as that described above.

The LDV 10 incorporating the diaphragm 18 is compact and relatively simple to manufacture. Further, the face-mask to which the LDV 10 is attached, does not have to be modified so that it can be used with the LDV 10.

As outlined above, although it has been described that the LDV 10 incorporating the diaphragm 18 complies with particular LDV and CBRN-specific requirements, it should be appreciated that the LDV 10 incorporating the diaphragm 18, or the diaphragm 18 itself, may comply with other requirements instead or in addition.

The invention claimed is:

1. A diaphragm for a lung demand valve, comprising:
   a CBRN layer which is sufficiently resistant to the permeation of at least some CBRN agents; and
   a resilient layer which is resiliently deformable;
   wherein the CRBN layer is arranged to restrict the permeation of at least some CBRN agents through the diaphragm, and wherein the resilient layer is arranged to allow the diaphragm to be resiliently deformed,
   wherein the resilient layer is discontinuous, and
   wherein the resilient layer comprises at least one opening.

2. A diaphragm according to claim 1, wherein the CBRN layer is deformable.

3. A diaphragm according to claim 1, wherein the CBRN layer is substantially continuous.

4. A diaphragm according to claim 1, wherein the CBRN layer comprises a plastics material.

5. A diaphragm according to claim 4, wherein the plastics material comprises polyvinylidene fluoride.

6. A diaphragm according to claim 1, wherein the CBRN layer has a thickness of between 0.001-0.05 mm.

7. A diaphragm according to claim 1, wherein the resilient layer comprises a plurality of openings.

8. A diaphragm according to claim 1, wherein the resilient layer is substantially rotationally symmetric.

9. A diaphragm according to claim 1, wherein the diaphragm is substantially rotationally symmetric.

10. A diaphragm according to claim 1, wherein the resilient layer comprises an elastomer.

11. A diaphragm according to claim 10, wherein the resilient layer comprises silicone.

12. A diaphragm according to claim 1, wherein the resilient layer has a thickness of between 0.1-2 mm.

13. A diaphragm according to claim 1, wherein the diaphragm comprises a sealing edge that is arranged to be retained by a part of the lung demand valve so as to provide a seal preventing fluid flow across the diaphragm.

14. A diaphragm according to claim 1, wherein the CBRN layer and the4 resilient layer are bonded together.

15. A diaphragm according to claim 1, wherein the CBRN layer and the resilient layer form a laminate.

16. A diaphragm according to claim 1, wherein the resilient layer is arranged such that in use it is on the ambient side and wherein the CBRN layer is arranged such that in use it is on the fresh breathable gas side.

17. A diaphragm according to claim 1, wherein the diaphragm further comprises a substantially rigid plate against which in use a spring and/or valve lever acts.

18. A diaphragm according to claim 17, wherein the rigid plate is attached to the resilient layer.

19. A diaphragm according to claim 18, wherein the resilient layer comprises a plate opening within which the rigid plate is located.

20. A diaphragm according to claim 18, wherein the CBRN layer extends across the rigid plate.

21. A lung demand valve comprising a diaphragm in accordance with claim 1.

22. A breathing apparatus comprising a lung demand valve in accordance with claim 21.

23. A method of upgrading a lung demand valve such that it is suitable for use in CBRN environments, comprising removing a conventional diaphragm from a lung demand valve, and subsequently fitting the lung demand valve with a diaphragm comprising:
- a CBRN layer which is sufficiently resistant to the permeation of at least some CBRN agents; and
- a resilient layer which is resiliently deformable, discontinuous and comprises at least one opening;

wherein the CRBN layer is arranged to restrict the permeation of at least some CBRN agents through the diaphragm, and wherein the resilient layer is arranged to allow the diaphragm to be resiliently deformed.

24. A lung demand valve, comprising:
a main housing defining an internal chamber;
a breathing port which is in fluid communication with the internal chamber and through which in use a user inhales;
a breathable gas inlet which in use is connected to a supply of breathable gas;
a valve assembly for controlling the supply of breathable gas to the user through the internal chamber and breathing port;
a diaphragm for controlling the valve assembly and which in use responds to the inhalation and exhalation of the user; wherein the diaphragm comprises:
a laminate structure comprising a continuous CBRN layer which is sufficiently resistant to the permeation of at least some CBRN agents and a discontinuous resilient layer which is resiliently deformable, said discontinuous resilient layer comprising at least one opening; wherein the CRBN layer is arranged to restrict the permeation of at least some CBRN agents through the diaphragm, and wherein the resilient layer is arranged to allow the diaphragm to be resiliently deformed.

* * * * *